United States Patent [19]

Hirose

[11] 4,403,559
[45] Sep. 13, 1983

[54] PROGRAMMING SYSTEM FOR A SEWING MACHINE

[75] Inventor: Mitsuhiro Hirose, Nagoya, Japan

[73] Assignee: Brother Kogyo Kabushiki Kaisha, Aichi, Japan

[21] Appl. No.: 239,164

[22] Filed: Feb. 27, 1981

[30] Foreign Application Priority Data

Mar. 17, 1980 [JP] Japan .................................. 55-34344

[51] Int. Cl.³ .............................................. D05B 21/00
[52] U.S. Cl. ............................................... 112/121.12
[58] Field of Search ...................... 112/121.12, 121.11, 112/121.15, 158 E, 102, 103

[56] References Cited

U.S. PATENT DOCUMENTS

| | | | |
|---|---|---|---|
| 4,190,007 | 2/1980 | Kimura et al. | 112/121.12 |
| 4,201,144 | 5/1980 | Manabe et al. | 112/121.12 |
| 4,290,375 | 9/1981 | Tonomura et al. | 112/121.12 |

Primary Examiner—Peter P. Nerbun
Attorney, Agent, or Firm—Browdy & Neimark

[57] ABSTRACT

A programming system for preparing stitch instructions for the purpose of controlling the relative position between a needle and a workpiece by means of so varying the relative position between an index member and a record medium as the index member traces after the profile figured on the record medium. In this system a manual operating member is disposed for designating the direction and speed of variation of the relative position between the index member and the record medium. An exact tracing of a profile of complicated shape is made possible by designating the speed appropriate for the tracing of the profile through varying the angle of inclination of the manual member according to the shape of the profile. The programming operation for preparing the stitch instructions can be performed in this way exactly and easily.

8 Claims, 8 Drawing Figures

PROGRAMMING SYSTEM FOR A SEWING MACHINE

BACKGROUND OF THE INVENTION

This invention relates to a programming system for a sewing machine which forms a desired seam on a workpiece by means of varying relative position between the needle and the workpiece according to programmed stitch instructions (this type sewing machine will be called hereunder a program controlled sewing machine). More particularly it relates to a programming system for preparing the above-mentioned stitch instructions according to operation of a manual member operable for varying relative position between a record medium wherein a profile corresponding to the above-mentioned seam is figured and an index member therefor, in such a way that the index member traces the profile.

There have been conventionally proposed many kinds of programming systems for the program controlled sewing machines. One of those programming systems was aimed to consecutively prepare stitch instructions by means of tracing the profile, figured on the record medium, corresponding to the seam, and was provided with a driving mechanism for varying the relative position between the index member and the record medium and a manual member for indicating the direction of variation of the relative position and for making the driving mechanism operate. For example a programming system provided with four keys for the purpose of varying the relative position in both directions of the X axis and the Y axis was known. In this system the driving mechanism varied the relative position between the record medium and the index member in a designated direction by the manual member, and the variation speed of the relative position was set at a constant low speed because exact programming for complicated parts of the profile required setting of the variation speed at a low level.

However, operation of the driving mechanism at the above-mentioned constant low speed was inefficient when the programming was carried out for straight linear or gently curved portions of the profile, and skilled operators desired to do the programming at a higher speed than the already mentioned constant low speed. On the contrary, even the already mentioned constant low speed was too fast to exactly trace the profile when the programming was conducted at extremely complicated parts thereof. Such was an inevitable disadvantage to the prior art.

SUMMARY OF THE INVENTION

The primary object of this invention is to provide a programming system, wherein the indication of the variation direction of the relative position between the record medium and the index member as well as the variation speed can be conducted by a simple operation of the operator for making the programming operation itself effective and exact.

For attaining this object a programming system of this invention for a sewing machine which varies the stitching relative position between a workpiece and a needle according to stitch instructions so as to form a desired seam on the workpiece comprises the following members, mechanisms, and means required for preparing the above-mentioned stitch instructions:

a record medium provided with a profile corresponding to the seam, an index member opposite to the record medium to trace the profile, a drive mechanism operative to vary the programming relative position between the record medium and the index member, operating means including a manual member operative to designate at least one direction on a fixed plane and to designate the speed of varying the programming relative position in the designated direction said manual member being capable of inclining toward said fixed plane, detecting means, associated with the operating means, for detecting the amount of inclination of the manual member and the direction designated by said manual member, and then generating detection signals related to the inclination amount and the designated direction, data processing means responsive to the detection signals, which determines tracing speed data corresponding to the inclination amount and position data corresponding to the variation in the programming relative position in said designated direction and prepares the stitch instructions based on the position data, instruction storage means for storing the stitch instructions prepared by the data processing means, means for controlling the operation of the drive mechanism according to the tracing speed data and position data; and means for inhibiting the operation of said drive mechanism when said inclination amount is a predetermined value or less.

Therefore in this programming system of this invention, when the index member or the record medium is moved for tracing the profile figured on the record medium owing to the operation of a manual operating member, detection signals for indicating the operational direction and the amount of inclination of the manual member, detected by the detecting means are respectively converted by the data processing means into the tracing speed data and the position data, and both data are transmitted to the means for controlling the operation of the drive mechanism. And the index member and record medium are relatively moved in a direction and at a speed desired, according to the detection signals by the drive mechanism under the control of the means for controlling the operation of the drive mechanism. The stitch instructions are prepared by the data processing means for being stored in order in the instruction storage means, and when the index member has performed the tracing the profile, the programming operation is finished.

DETAILED DESCRIPTION OF THE PREFERRED EMBODIMENT

Figure 1:
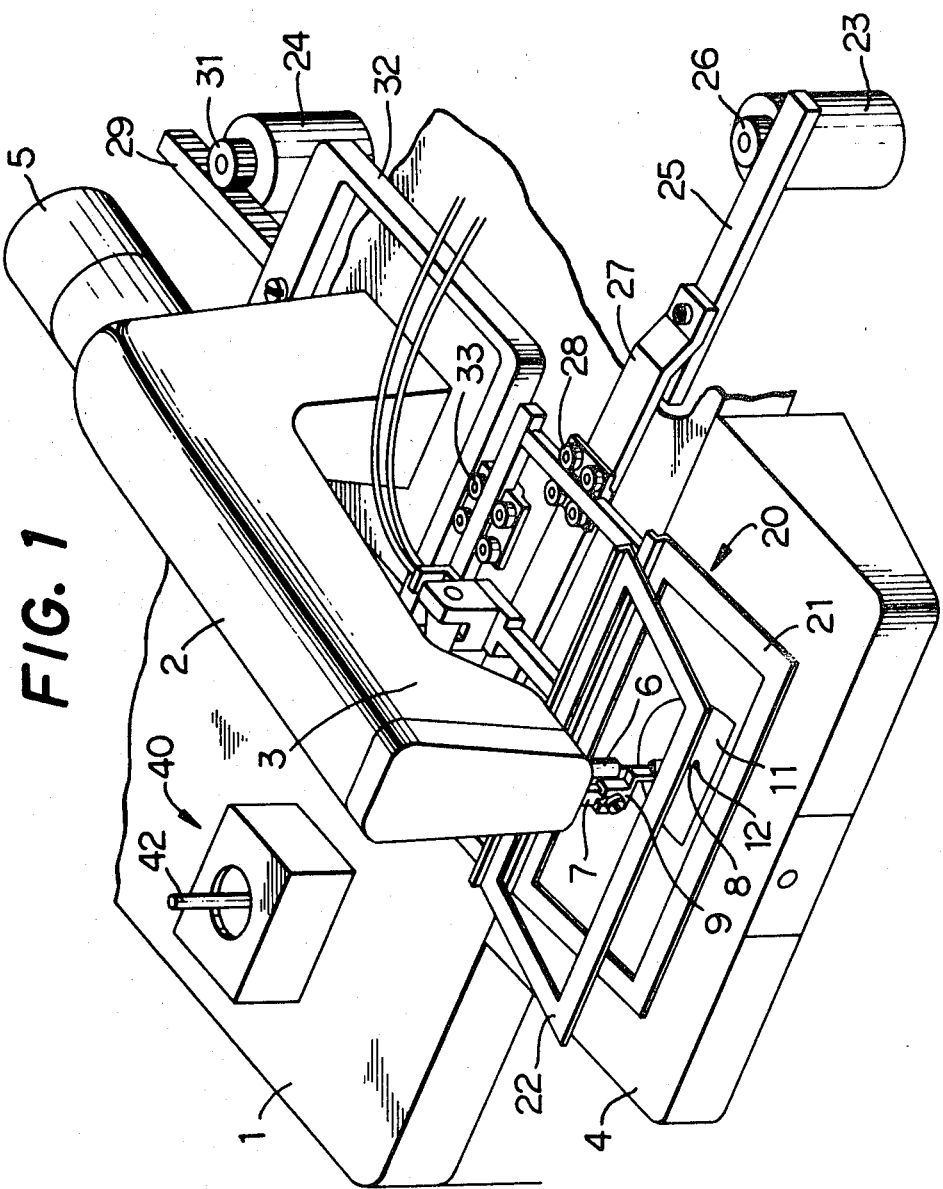
FIG. 1 is a perspective view of a program controlled sewing machine in which an embodiment of a programming system of this invention is incorporated.

On a bed 1 a bracket arm 2 is mounted with a head 3 thereof being hung over a table 4 forwardly projected from the bed 1. The head 3 is provided with a needle bar 6 which is driven by a drive motor 5 to vertically reciprocate and a presser bar 7 vertically reciprocable when necessary. On the lower end of the needle bar 6 a needle 8 is attached, and on the lower end of the presser bar 7 a presser foot 9 is attached. Beneath those members a throat plate 11 is disposed such that a needle aperture 12 thereof is located right below the needle 8. On the table 4 a workholder 20 is movable relative to the needle 8 which is able to function as an index member, and an X pulse motor 23 and a Y pulse motor 24 are respectively driven to move the workholder 20 in two directions of X axis and Y axis which are orthogonal. When the programming is carried out in a sewing machine of this embodiment, a record medium with a profile figured thereon is retained in a sandwiched state between a lower frame 21 and an upper frame 22 of the workholder 20, and moved by means of both pulse motors 23, 24. On the other hand, when the stitch forming operation is carried out, the needle 8 is vertically reciprocated by the driving of the drive motor 5 and the workpiece sandwiched between the lower frame 21 and the upper frame 22 of the workholder 20 is moved relative to the needle 8 by means of the X pulse motor 23 and the Y pulse motor 24. In other words, the drive mechanism containing the pulse motors 23, 24 and the needle 8 are both utilized concurrently for programming purpose.

The lower frame 21 of the workholder 20 is connected to a movable member 27, which can be moved in the X axis direction, i.e., lateral direction by the X pulse motor 23 by way of a rack 25 and a pinion 26, for being slidable over the movable member 27 in the Y axis direction, i.e., forward and backward direction with the aid of a roller 28. The lower frame 21 is at the same time connected to the other movable member 32 which can be moved in the Y axis direction by the Y pulse motor 24 by way of a rack 29 and a pinion 31 for being slidable over the movable member 32 in the X axis direction with the aid of a roller 33. The lower frame 21 can thus be moved over the bed 1 in accordance with the rotational angle and the rotational direction of the pulse motors 23, 24 for being varied in the relative position to the needle 8.

Figure 2:
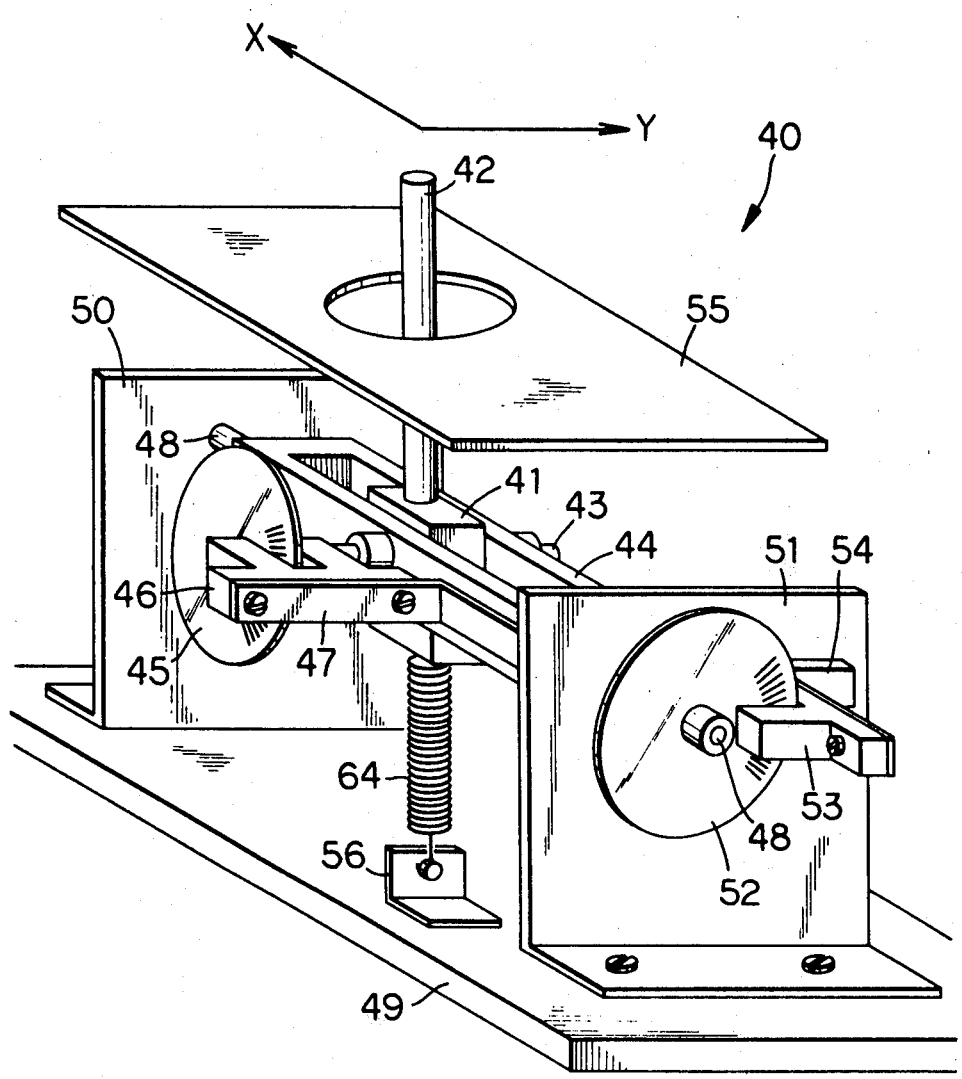
FIG. 2 is a perspective view of an operating device in the programming system.
Figure 8:
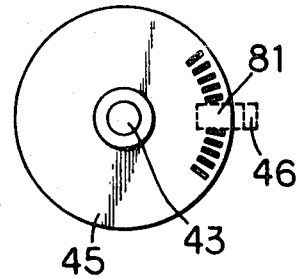
FIG. 8 is an elevational view of a disc employed in a rotation detecting apparatus together with the detector shown in FIG. 4.

On the bed 1 is disposed an operating device 40 for designating the direction and speed of the relative movement between the workholder 20 and the needle 8 during a programming. According to FIG. 2 wherein the structure of the operating device 40 is illustrated, a Y rotary frame 41 is so pivoted with a Y rotary shaft 43 which is integral therewith in the middle part of and on the inside of an X rotary frame 44 as to be rotatable about a Y directional axis. On the top of the Y rotary frame 41 a manual stick 42 as the manual member is secured. This manual stick 42 is consequently capable of inclining toward a fixed plane parallel to the plane where the workholder 20 is moved. On one end of the Y rotary shaft 43 a disc 45 is attached for the purpose of detecting the rotation angle of the Y rotary shaft 43, and the disc 45 is provided with a plurality of slits formed radially and equidistantly and an insensitive or dead band 81 having no slits therein, as shown in FIG. 8. And a Y angle detector 46 is provided with a light emitting element and a light receiving element faced to each other on both inside surfaces of a bifurcated portion thereof, and is mounted on the X rotary frame 44 with a bracket 47 in such a positional relation that the light emitting element and the light receiving element are intercepted by the disc 45 therebetween. The X rotary frame 44 is provided with a pair of X rotary shafts 48 on both ends of the frame body thereof, and the X rotary shafts 48 are carried by a pair of side plates 50, 51 secured to a base plate 49, thereby the X rotary frame 44 being rotatable about the X axis. A disc 52 is attached on one end of the X rotary shaft 48 for the purpose of detecting the rotation angle of the shaft 48, and is provided with a plurality of slits formed radially and equidistantly and an insensitive band identical to the bend 81. And an X angle detector 53 includes a light emitting element and a light receiving element faced to each other on both inside surfaces of a bifurcated portion thereof, being mounted on the side plate 51 with a bracket 54 in such a positional relation that the light emitting element and the light receiving element are intercepted by the disc 52 therebetween. An upper plate 55 of rectangular shape with a round hole in the central portion is secured to each of the side plate 50, 51, being pierced by the manual stick 42 through the central round hole, so as to constitute an upper cover or a lid for the operating device 40 and function as a stopper for the manual stick 42. Between the lower end of the Y rotary frame 41 and a bracket 56 located right beneath thereof on the base plate 49 a tension spring 64 as tension means is anchored for constantly biasing the Y rotary frame 41 so that the manual stick 42 may be upright.

Figure 3:
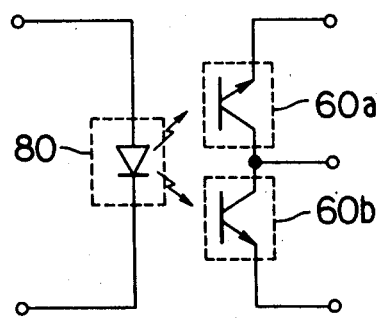
FIG. 3 is a diagram of an electric circuit of a detector employed in the programming system.
Figure 4:
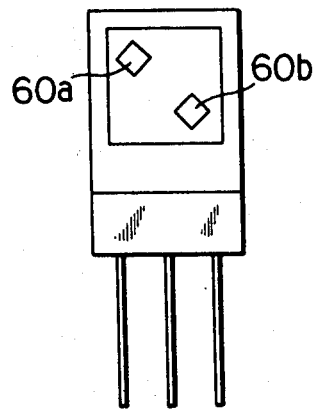
FIG. 4 is an elevational view of a light receiving element of the detector for showing the arrangement of two phototransistors therein.

Therefore, when the manual stick 42 is operated at an inclination angle corresponding to a desired speed and in a desired direction in order to make a relative movement between the record medium and the index member, both the X rotary frame 44 and the Y rotary frame 41 are rotated. As the discs 52, 45 respectively having the plurality of radial slits are integrally fixed to the X rotary frame 44 and the Y rotary frame 41, the X angle detector 53 and the Y angle detector 46 detect the passage of the light through the slits and generate pulse signals the numbers of which are respectively corresponding to the rotation angles of the discs 52, 45. The operating device 40 is so constructed as mentioned above that it can indicate advantageously the direction and speed of the relative movement between the record medium and the index member with the relatively simple structure. An angle detector in this embodiment, for example, the X angle detector 53 is provided with the light receiving element having a pair of transistors 60a and 60b, as shown in FIGS. 3 and 4, for detecting not only the rotational amount but also the rotational direction of the disc 52. So it generates two series of pulses having a time difference therebetween in response to a light beam passing through one given slot. Numeral 80 designates a light emitting element.

Figure 5:
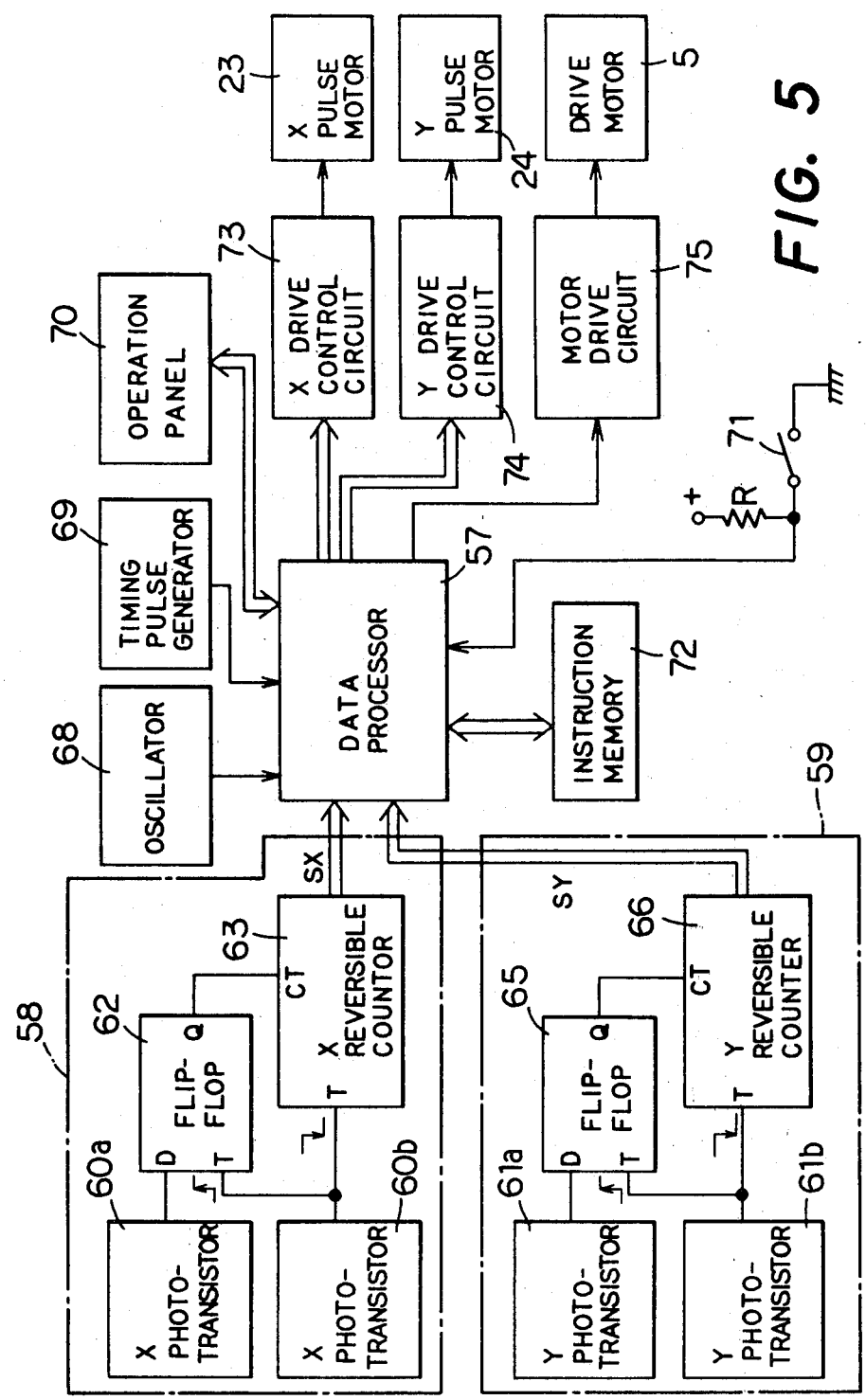
FIG. 5 is a block diagram for showing the electric system of the program controlled sewing machine.

According to FIG. 5, which shows the electric system in the sewing machine of this embodiment, a data processor 57 located in the center is surrounded by an X input counting circuit 58, a Y input counting circuit 59, an oscillator 68, a timing pulse generator 69, an operation panel 70, a dual mode switch 71, an instruction memory 72, etc. The system further contains an X drive control circuit 73, a Y drive control circuit 74, and a motor drive circuit 75.

In order to generate binary signals indicating the rotation angle of the manual stick 42 about the X axis and supply the binary signals to the data processor 57, the X input counting circuit 58 is constructed as described hereunder. An output terminal of the transistor 60a of the X angle detector 53 is connected to an input terminal D of a D-type flip-flop circuit 62 for detecting the rotation direction of the disc 52 and to a timing input terminal T of the D-type flip-flop circuit 62 an output terminal of the transistor 60b which shares the pair with the transistor 60a is connected, an output terminal of the flip-flop circuit 62 is connected to a control input terminal CT of an X reversible counter 63. To a count input terminal T of the X reversible counter 63 the output terminal of the transistor 60b is connected for detecting the rotation angle about the X axis, and further an output terminal of the X reversible counter 63 is connected to an input terminal of the corresponding data processor 57 through a data line SX for transferring a binary signal indicating the rotation angle of the X rotary shaft 48. The above-mentioned structure of the X input counting circuit 58 similarly holds true in that of the Y input counting circuit 59. That is to say, all of the circuit structure is identical, except only changing of the disc 52 to the disc 45, the D-type flip-flop 62 to a D-type flip-flop 65, the X angle detector 53 to the Y angle detector 46, the transistors 60a, 60b to the transistors 61a, 61b, the X reversible counter 63 to a Y reversible counter 66, and the data line SX to a data line SY.

Figure 6:
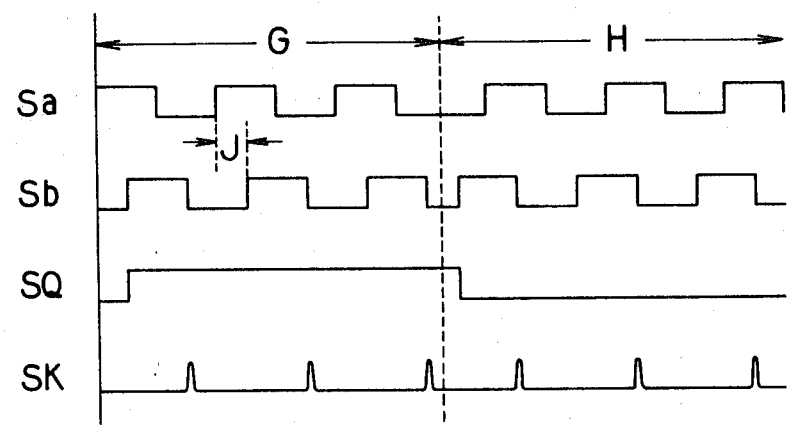
FIG. 6 is a graph showing the wave form of signals for explaining the operation of the programming system.

When the disc 52 is forwardly rotated the output signals of the transistors 60a, 60b corresponds to Sa signal and Sb signal in G section of the signal wave form in FIG. 6. Those signals are applied to the D terminal and the T terminal of the D-type flip-flop circuit. Between the two signals Sa and Sb a time difference J appears because of the location difference of the transistors 60a and 60b. The signal Sb is constantly behind the signal Sa. As the D-type flip-flop circuit latches the D input signal from an input of the timing signal to next input of the same, the output signal of the flip-flop circuit 62 in the G section becomes "H" level as SQ signal in FIG. 6. When on the contrary the disc 52 is backwardly or reversely rotated a relation between signals Sa, Sb, and SQ in the H section, changes as shown in FIG. 6, and the output signal of the flip-flop circuit 62 becomes "L" level. The X reversible counter 63 has the function of addition and subtraction, and consequently it utilizes the SQ signal in FIG. 6 as a controlling signal for the addition or the subtraction and counts an SK signal of FIG. 6 produced in response to falling of the Sb signal of FIG. 6. As a result of the addition and the subtraction the X reversible counter 63 generates a signal corresponding to the rotation angle of the X rotary shaft 48 on the data line SX. The action of the Y input counting circuit 59 is entirely identical to that of the X input counting circuit 58.

The oscillator 68 is an ordinary one for supplying oscillating signals with a reference frequency which is corresponding to the maximum speed of the X pulse motor 23 and the Y pulse motor 24, and an output terminal thereof is connected to a corresponding input terminal of the data processor 57, wherein the frequency dividing ratio of the oscillating signal is determined according to the signal of the rotation angle of the X rotary shaft 48, i.e., the inclination angle of the manual stick 42. A signal having a frequency obtained as the product of the frequency dividing ratio and the reference frequency is supplied to an X drive control circuit 73 and a Y drive control circuit 74 as a step commanding pulse. The timing pulse generator 69 generates a timing signal when the needle 8 is at a predetermined upper position and an output terminal thereof is connected to a corresponding input terminal of the data processor 57. Based on the timing signal the data processor 57 supplies drive signals for the X and Y pulse motor 23, 24 to the X drive control circuit 73 and the Y drive control circuit 74, thereby the workpiece being moved synchronously with the vertical reciprocating movement of the needle 8.

The operation panel 70 is a panel, on which keys and indicators required for the programming operation are arranged, such as a load key for storing the data corresponding to the position of the index member at each stitch point in the instruction memory 72, an end key for indicating the termination of the programming, a reset key, indicators for indicating the movement amount of the index member in the X and Y axes, and an indicator of the stitch pitch. Terminals of those keys and indicators are all connected to the data processor 57. The dual mode switch 71 usually disposed on the front side of the programming system is for selecting either one of the uses of the apparatus of this embodiment as a programming system or as a sewing machine. The instruction memory 72 is a so-called random access memory which stores or memorizes stitch instruction including the direction and amount of the relative movement of the index member to the workholder 20 in the course of a programming operation sequentially per each operation of the load key and supplies reversely the stitch instructions to the data processor 57 during the sewing operation. The instruction memory 72 and the data processor 57 are connected by a data line to each other. The X drive control circuit 73 and the Y drive control circuit 74 respectively receive a series of step commanding pulses for commanding the step operation of the X and Y pulse motors 23, 24 from the data processor 57 and shift the energization phase of the pulse motors 23, 24 in response to each of the series of the pulses in order to vary the driving speed of the pulse motors 23, 24 according to the variation of the frequency of the series of the pulses. The structure of the drive control circuits is already known widely, with detailed description thereof being omitted herewith. The motor drive circuit 75 is for supplying electric power to the drive motor 5 based on the speed commanding signal and the drive control signal from the data processor 57 for driving the same so as to actuate the sewing mechanism.

Figure 7:
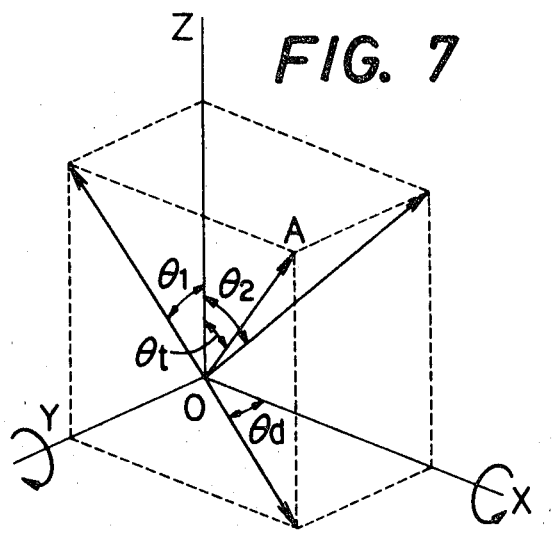
FIG. 7 is a diagram for showing relationship between the operational angle of a manual stick in the operating device and the rectangular coordinates X, Y, and Z.

Control operation of the data processor 57 while the dual mode switch 71 is contacted to the side of the programming will be explained hereunder. The data processor 57 supplies the drive command or stoppage (inhibit) command for the drive mechanism to the X and Y drive control circuits 73, 74 in accordance with whether the rotation angle of the disc is within a predetermined range or not. While the inclination angle of the manual stick 42 is so small as to fall in the predetermined range, the data processor 57 generates the stoppage command inhibiting the drive mechanism from operating, and when the inclination angle exceeds the limits of the predetermined range, the data processor 57 applies the drive command to the X and Y drive control circuits 73, 74. To the data processor 57 the count content Px of the S reversible counter 63, which corresponds to the inclination angle $\theta_1$ of the manual stick 42 around the X rotary shaft 48, is applied through the data line SX, and also the count content Py of the Y reversible counter 66, which corresponds to the inclination angle $\theta_2$ of the manual stick 42 around the Y rotary shaft 43, is applied through the data line SY. Herewith two equations $$\theta_1 = K.Px$$

and $$\theta_2 = K.Py$$

are established, wherein K is constant. As shown in FIG. 7, assume that in the rectangular coordinates of X-Y-Z OA designates the manual stick 42 and an angle formed between OA and the axis Z is indicated as $\theta_t$, the projected angle of the angle $\theta_t$ on a plane X-Y is $\theta_d$ and the projected angle of the same on a plane Y-Z is $\theta_1$, and that on a plane X-Z is $\theta_2$.

Based on the count contents Px and Py the angle $\theta_t$ which signifies the amount of inclination of the manual stick 42 can be determined, which enables the determination of the frequency dividing ratio of the oscillator 68. The angle $\theta_d$ which signifies the operational direction of the manual stick 42 can be similarly determined according to the count contents Px and Py. The data processor 57 calculates the number of step commanding pulses, which are needed when the index member traces the profile on the record medium in its operational direction by a unit amount, and generates the calculated numbers of step commanding pulses at a frequency which has been determined by means of dividing the reference frequency of the oscillator 68 by a frequency dividing ratio determined based on the above-mentioned angle $\theta_t$. That is, in this embodiment, the numbers of step commanding pulses is the position data and the frequency dividing ratio is the tracing speed data. The step commanding pulses from the data processor 57 are respectively delivered to the X drive control circuit 73 and the Y drive control circuit 74. The needle 8 as the index member traces the profile in the operational direction of the manual stick 42 at a corresponding speed to the inclination angle of the manual stick 42 owing to the driving of both pulse motors 23, 24. When the needle 8 has reached a desired position on the profile a stitch instruction including stitch position data consisting of movement amounts in the X axis and in the Y axis and signs indicating the plus and minus direction of each axis is stored, by means of an operation of the load key, in the instruction memory 72.

The controlling action or function of the data processor 57, when the dual mode switch 71 is in contact with the side of sewing operation, will be explained in respect of this embodiment having the above-mentioned electric system. Stitch instructions stored in the instruction memory 72 are, during the sewing operation, sequentially read out in response to the timing pulses supplied from the timing pulse generator 69 for being delivered to the X and Y drive control circuits 73, 74 as signals indicating the rotation direction and rotation amount to the X and Y pulse motors 23, 24. The workpiece is moved in this way in the programmed direction and amount. A drive control command for the drive motor 5 is delivered to the drive motor circuit 75, and the rotation speed of the drive motor 5 is controlled according to the drive speed data in the stitch instructions which are stored in the instruction memory 72. The drive speed data is automatically made by the operation of the load key in parallel with the stitch position data. In other words, the data processor 57 performs the data processing in accordance with a predetermined program such that the drive speed data is made as one indicating a low speed command in the starting and terminating stage of the sewing and as one indicating a high speed command in the ordinary sewing period.

The above description is for explaining one embodiment, not for limiting this invention to this embodiment. The present invention should be interpreted to allow many modifications or alterations, so long as they do not deviate from the scope of the invention.

Although the stitch instruction in this embodiment contains both the stitch position data and the drive speed data, in such a sewing machine wherein the operator herself can determine the drive speed data by means of an external operating means the stitch position data is stored in the instruction memory 72 as the stitch instruction. Instead of pulse motors employed in this embodiment for the driving of the X axis and the Y axis, it is permissible to utilize a drive motor of other kind, for example a d-c motor. In such a case a position detector for detecting the rotational amount of the d-c motor is required in place of the oscillator 68, and data processing means generates the tracing speed data and position data of the d-c motors for the driving in the X axis and the Y axis and supplies both data to control means which controls each of the d-c motors in respect to its speed according to the tracing speed data and in respect to its rotational position according to the position data and a signal from the position detector. In this embodiment, as the rotation angle detector for the X axis and the Y axis the combination of the discs 52, 45 attached respectively to the X rotary shaft 48 and the Y rotary shaft 43, the plurality of slits radially and equidistantly formed on the discs 52, 45, and the X and Y angle detectors 53, 46 for detecting passing of the slits is utilized so as to detect the operational state of the manual member disposed in the operating device. However, it can be replaced by any means which is capable of converting the rotation angle into electric signals. For example, discs 52, 45 may be modified so as to be able to convert the rotation angle into pulse signals, if they are provided, in place of the slits, with a certain number of small magnetized areas which are detected by the adjacently arranged magnetic heads. Another apparatus, wherein a brush of a potentiometer is fixed on the rotary shaft so as to pick up the voltage corresponding to the rotation angle and an A/D converter converts the voltage into a binary signal, will do for the purpose. On the other hand, the tracing operation of the manual stick 42 and the load key operation are repeated in order until the termination of the programming, in this embodiment, but another way of storing in advance a data processing program, in which a relative movement between the needle 8 as the index member and the profile exceeding 2 mm is automatically loaded, in the data processor 57 is also permissible. This method can be said advantageous as a more effective programming, because it enables to eliminate the load key operation which must be conducted at each index member stoppage per each corresponding point of the profile to the stitch forming position. In the above stated tracing operation, the relative movement speed between the needle 8 as the index member and the profile is in this embodiment determined based on the reference frequency of the output signal from the oscillator 68, but the desirable speed at which the index member traces the profile is not constant, being variable according to tracing conditions such as shape of the profile and skill of the operator. It is therefore possible to adjust the maximum relative movement speed so as to adapt it to the tracing condition, by means of disposing a setting dial capable of setting a frequency dividing ratio suitable for the tracing condition. The data processor 57 calculates the maximum frequency of step commanding pulses for the pulse motor by means of multiplying the reference frequency by the set frequency dividing ratio. The data processor 57 in this embodiment possesses function as an electronic computer, so a micro-computer can be substituted for the same, which enables minuaturization and cost economization of the whole apparatus.

Instead of a mechanical device of providing the disc 45, 52 with the insensitive band 81, it is possible to employ an electric device wherein the previously set number of counting signals corresponding to a predetermined angle range in the neighborhood of the neutral position of the discs 45, 52 is compared with the actual number of counting signals indicating the rotation angle of each disc so that the drive command is generated only when the latter exceeds the former.

The programming system according to the present invention makes it possible to exactly trace even a complicated profile by designating a tracing speed and a tracing direction according to the programming system is advantageous in that the programming is not affected by slight deviation in angle of inclination of the manual member in the neighborhood of the neutral position, thereby assuring stable functioning of the drive mechanism and consequently a highly accurate sewing along the desired profile.

What is claimed is:

1. A programming system for a sewing machine which varies the stitching relative position between a workpiece and a needle according to stitch instructions so as to form a desired seam on the workpiece, said programming system for preparing the stitch instuctions comprising:
    a record medium provided with a profile corresponding to said seam;
    an index member opposite to said record medium to trace said profile;
    a drive mechanism operative to vary the programming relative position between said record medium and said index member;
    operating means including a manual member operative to designate one of directions on a fixed plane and to designate the speed of varying said programming relative position in the designated direction, said manual member being capable of inclining toward said fixed plane;
    detecting means, associated with said operating means, for detecting the amount of inclination of said manual member and the direction designated by said manual member, and then generating detection signals related to the inclination amount and the designated direction;
    data processing means responsive to said detection signals, said data processing means determining tracing speed data corresponding to said inclination amount and position data corresponding to the variation in said programming relative position in said designated direction, and preparing said stitch instructions based on the position data;
    instruction storage means for storing said stitch instructions prepared by said data processing means;
    means for controlling the operation of said drive mechanism according to said tracing speed data and said position data; and
    means for inhibiting the operation of said drive mechanism when said inclination amount is a predetermined value or less.

2. A programming system as set forth in claim 1, wherein said manual member is capable of inclining toward said fixed plane, and said detecting means detects the amount of inclination of said manual member and the direction designated by said manual member and then generates said detection signals related to the inclination amount and the designated direction.

3. A programming system as set forth in claim 2, wherein said data processing means determines said tracing speed data corresponding to said designated speed which is varied according to said inclination amount.

4. A programming system as set forth in claim 1, wherein said drive mechanism includes two drive motors for varying said programming relative position in first and second coordinate directions which are orthogonal on a plane parallel to said fixed plane, said operating means includes a first member pivotally movable about a first axis parallel to said first coordinate direction, and a second member mounted on said first member and pivotally movable about a second axis parallel to said second coordinate direction, and said manual member is secured to said second member.

5. A programming system as set forth in claim 4, wherein said operating means further includes tension means for urging said second member so that said manual member may be perpendicular to said fixed plane.

6. A programming system as set forth in claim 4, wherein said detecting means includes a first detector operatively connected to said first member for detecting the amount and direction of movement of said first member, and a second detector operatively connected to said second member for detecting the amount and direction of movement of said second member.

7. A programming system as set forth in claim 1 further including manual switch means operative to command said data processing means to prepare said stitch instructions.

8. A programming system as set forth in claim 1, wherein said data processing means compares the variation of said programming relative position with a predetermined value, and prepares each of said stitch instructions when said variation is not less than said predetermined value.

* * * * *